No. 756,659. PATENTED APR. 5, 1904.
J. P. LAVIGNE.
TURRET LATHE.
APPLICATION FILED APR. 6, 1903.
NO MODEL. 6 SHEETS—SHEET 1.

No. 756,659. PATENTED APR. 5, 1904.
J. P. LAVIGNE.
TURRET LATHE.
APPLICATION FILED APR. 6, 1903.
NO MODEL. 6 SHEETS—SHEET 2.

No. 756,659. PATENTED APR. 5, 1904.
J. P. LAVIGNE.
TURRET LATHE.
APPLICATION FILED APR. 6, 1903.
NO MODEL. 6 SHEETS—SHEET 4.

No. 756,659. PATENTED APR. 5, 1904.
J. P. LAVIGNE.
TURRET LATHE.
APPLICATION FILED APR. 6, 1903.
NO MODEL. 6 SHEETS—SHEET 6.

No. 756,659. Patented April 5, 1904.

UNITED STATES PATENT OFFICE.

JOSEPH P. LAVIGNE, OF DETROIT, MICHIGAN.

TURRET-LATHE.

SPECIFICATION forming part of Letters Patent No. 756,659, dated April 5, 1904.

Application filed April 6, 1903. Serial No. 151,215. (No model.)

*To all whom it may concern:*

Be it known that I, JOSEPH P. LAVIGNE, of Detroit, in the county of Wayne and State of Michigan, have invented a new and useful Improvement in Turret-Lathes; and I do hereby declare the following, when taken in connection with the accompanying drawings and the numerals of reference marked thereon, to be a full, clear, and exact description of the same, and which said drawings constitute part of this specification, and represent, in—

Fig. 3ª, a broken view, partly in elevation and partly in section, of the stock-feeding mechanism; Fig. 6ª, a detached view looking at the lower end of the arm depending from the housing of the arbor of the friction-disk; Fig. 7ª, a vertical section on the line *h i* of Fig. 7 looking to the right.

My invention relates to an improvement in turret-lathes of what may be called the "screw-machine" type, the object being to produce an effective and durable machine constructed with particular reference to range and convenience of precise adjustment and rapidity and accuracy of operation.

With these ends in view my invention consists in a machine having certain details of construction and combinations of parts, as will be hereinafter described, and pointed out in the claims.

Figures 3, 3A:
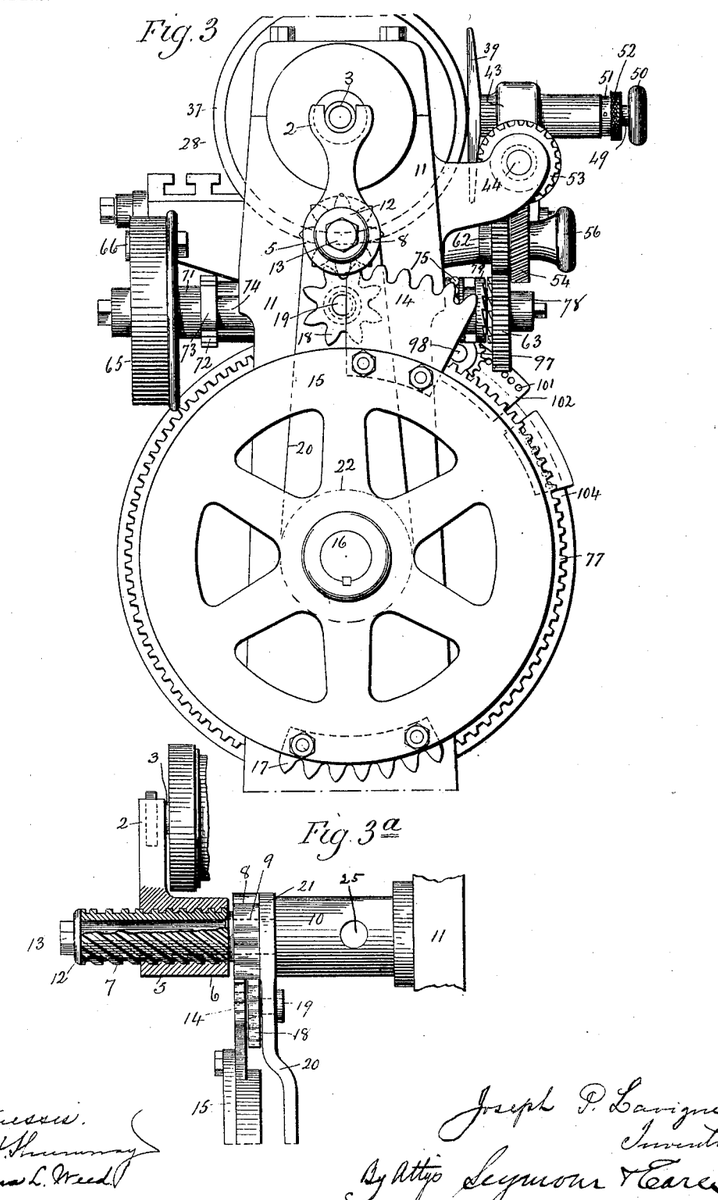
Fig. 3, a left-hand end view of the machine, or, in other words, a view of the machine in end elevation from the stock-feeding end thereof.

For convenience I will describe the machine from left to right, or from its feeding end to its cutting end. Beginning with its stock-feeding clutch 2, the same is mounted upon the outer end of a hollow work-spindle or mandrel 3, the inner end of which carries the stock-holding chuck or clutch 4, the same being of ordinary construction and operation. (See, for instance, United States Patent No. 671,568, of April 9, 1901.) The said clutch 2 is connected with a sliding clutch-block 5, having an internally-threaded sleeve 6 riding upon a heavy operating-worm 7, which for convenience of identification I shall hereinafter call the "stock-feeding" worm. The said worm 7 is provided at its inner end with a gear-wheel 8 and journaled upon a stud 9, carried by a bracket 10, secured to the frame 11 of the machine. A washer 12, abutting against the outer end of the worm and held in place by a screw-bolt 13, Fig. 3, entering the outer end of the stud 9, holds the worm in place thereon. The stock-feeding clutch 2 is moved inward for feeding the stock by the rotation of the worm 7 in one direction and outward for taking a new hold upon the stock by the rotation of the worm in the opposite direction. It will of course be understood that the stock is in the form of a long rod which is fed step by step through the hollow work-spindle 3. The worm is rotated in one direction by the action upon the gear-wheel 8 of a segmental rack 14, bolted to a wheel 15 upon the main shaft 16, which I speak of as the "main shaft," because it carries the means for driving and controlling the several instrumentalities of the lathe. For convenience of identification I shall hereinafter call this wheel the "stock-feeding" wheel. The worm is rotated in the opposite direction by means of a segmental rack 17, also bolted to the wheel 15, but flush with the periphery thereof and meshing into an intermediate gear-wheel 18, which in turn meshes into the gear-wheel 8, before mentioned, and drives the same for turning the worm in the opposite direction, the intermediate gear-wheel 18 being mounted upon a stud 19, carried by a frame-piece 20, having at its upper end a ring 21, through which the stud 9 passes, and having at its lower end a ring 22, which encircles the main shaft 16. It will be understood that the stock-feeding wheel 15 always revolves in the same direction; but by means of the gear-wheels 8 and 18 and the racks 14 and 17 the worm 7 is rotated in opposite directions. During each rotation in one direction of the wheel 15 the worm is rotated once one way and once the other way. The sliding clutch-collar 23, which is also mounted upon the hollow work-spindle 3, is operated by means of a lever 24, hung upon a stud 25 on the bracket 10 and having its lower end adapted to coact with cams 26 26 upon a cam-wheel 27 on the main shaft 16.

The machine is driven by a constantly-operated loose pulley 28, run by a belt (not shown) driven from any convenient source of power. This pulley is loosely mounted upon the hollow work-spindle 3, upon which a similar pulley 29 is also loosely mounted. The pulley 28 is the main driving-pulley of the lathe and will hereinafter be so called, while the pulley 29 is used for reversing the work-spindle 3 and is commonly called the "backing-off" pulley. The pulley 28 is constantly driven in one direction and drives the main shaft 16 of the machine. On the other hand, the pulley 29 is constantly driven by a belt (not shown) in the opposite direction, but performs no other function than that of reversing or "backing-off" the work-spindle. A sliding clutch 30, located between the said pulleys, is employed for coupling the main driving-pulley 28 with the work-spindle 3 for driving the spindle forward and for coupling the pulley 29 with the spindle for reversing the same. It is to be understood, however, that the main driving-pulley 28, whether coupled with the spindle or not, is always operating to drive the main shaft of the lathe, while the pulley 29, though constantly driven in the opposite direction, performs no function except when coupled with the spindle and then no other function than to reverse the same. The said clutch 30 is operated by means of a lever 31, turning on a stud 32 and having its lower end furnished with a horizontally-arranged pivotal arm 33, carrying a depending pin 34, acted upon by the inclined or cam face 35 of a clip-like cam $35^a$, clamped upon the periphery of a wheel 36, mounted upon the main shaft 16. This wheel 36 I shall hereinafter call the "change-speed" wheel for reasons to appear later on. The said cam $35^a$ will be placed upon the periphery of the wheel 36 so as to effect the operation of the clutch 30 periodically and just as soon as it is desired to shift from driving the work-spindle forward to reversing it, or vice versa.

Figure 1:
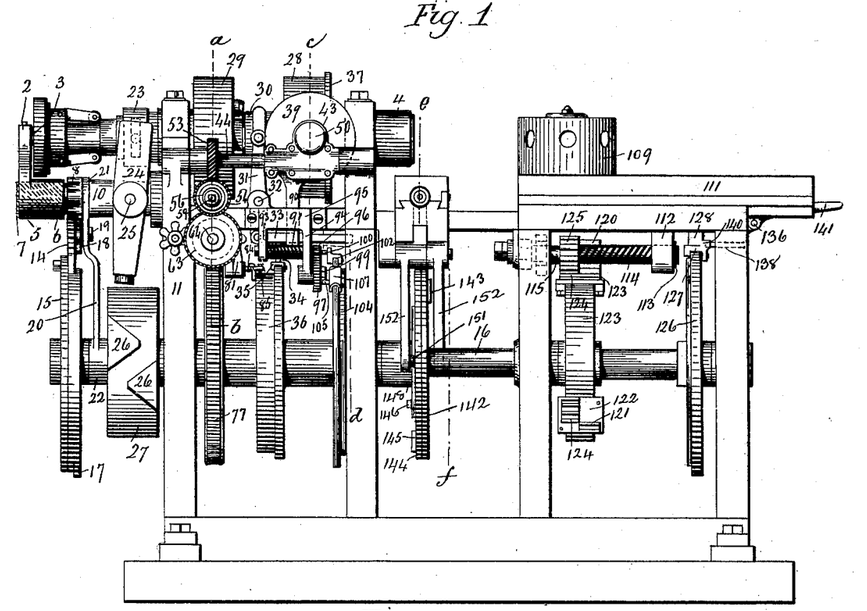
Figure 1, a view in front elevation of a turret-lathe constructed in accordance with my invention.
Figure 2:
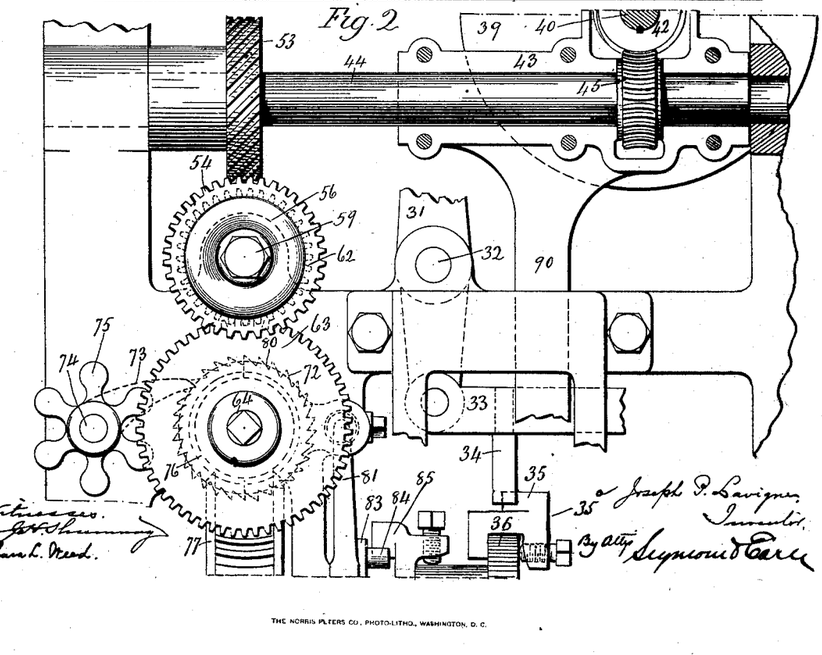
Fig. 2, a broken view in front elevation on a larger scale than Fig. 1, showing the train of parts employed to drive the main shaft from the driving-pulleys through which power is applied to the lathe.

The main shaft 16 is driven from the main driving-pulley 28, which has a friction-ring 37, made of leather or equivalent material, secured to its inner face by screws 38, the edge of the said ring projecting beyond the periphery or face of the pulley. The edge of this friction-ring engages with the surface of a friction driving-disk 39 at points more or less remote from the center thereof, according to the speed at which it is desired to drive the main shaft 16, the friction-disk 39 being moved transversely with respect to the friction-ring 37 for the purpose of varying the speed of the shaft 16, as will be hereinafter explained. The variation in the speed of the main shaft 16 here provided for enables the speed thereof to be regulated to a nicety and provides for close or precise speeding of the machine in addition to the fast or slow speeding thereof provided for in another way, as will be described later on. The said disk is mounted upon a short arbor 40, passing through and keyed to the long hub or sleeve 41 of a worm-pinion 42, located in a housing 43, movable at a right angle to the hollow mandrel 3 on a transversely-arranged shaft 44, provided with a worm-gear 45, into which the worm-pinion 42 meshes. The outer end of the arbor 40 is provided with one member, 46, of a ball-bearing, the other member, 47, of which is recessed for the reception of a spring 48, located within the hollow stem 49 of a hand-wheel 50. The stem 49 is externally threaded for introduction into an internally and externally threaded bushing 51, entered into the outer end of the housing 43. A jam-nut 52, mounted upon the stem 49, is provided for holding it in any adjustment. Under this construction the lower end of the spring 48 is always tending to crowd the friction-disk 39 onto the friction-ring 37 on the pulley 28, which operates, through the ring 37, disk 39, arbor 40, pinion 42, and gear 45, to rotate the transversely-arranged shaft 44. The movement of the said shaft 44 is transmitted to the main shaft 16 by means of a worm-gear 53, Figs. 2 and 4, mounted upon it and meshing into a gear-wheel 54, fitted upon a shoulder 55, located between the head 56 and tubular externally-threaded shank 57 of a thumb-screw located upon a heavy stud 58, mounted in the machine-frame 11, Fig. 4, the said thumb-screw being secured to the stud 58 by means of a nut 59. The inner face of the gear 54 is formed with a conical recess 60 for the reception of the beveled coupling-nose 61 of a pinion 62, the hub of which is internally threaded and mounted upon the long externally-threaded shank 57 of the said thumb-screw. In this way the gear 54 and the pinion 62 are frictionally coupled together by means of a thumb-screw, on the shank of which both of them are mounted. They can be shifted with respect to each other as desired and will slip on one another, so as to prevent the breakage of the machine should the same encounter an obstruction superior in power to the friction-grip between them. The pinion 62 meshes in turn into a gear-wheel 63, mounted upon an inclosed shaft 64, which is employed to drive the main driving worm-wheel 77 and through the same the main shaft 16 of the lathe. In order, however, to provide for widely varying the speed of the shaft 16, and hence the speed of the machine, so as to cause the same to run slow or fast, I interpose a speed-changing mechanism between the said shaft 64 and change-speed wheel 36. This speed-changing mechanism employs that type of gearing technically known in mechanics as "planet-motion" gearing. Such a mechanism is described in conjunction with my reissued Letters Patent, No. 11,690, of August 30, 1898.

It will now be understood that by means of the "planet-motion" speed-changing mechanism I secure two main speeds for the machine—namely, a slow speed and a fast speed—and that by means of the friction-disk speed-changing device I modify with extreme nicety the slow speed of the machine, as may be required to accomplish the specific work which the machine is called upon to do.

Proceeding now to describe the "planet-motion" speed-changing mechanism above referred to, the inclosed shaft 64, which is a driving-shaft and constantly rotated, has secured to its opposite end a cup 65, carrying a stud 66, upon which is mounted a pinion 67, in constant mesh with two gear-wheels 68 and 69, corresponding in size but differentiated in the number of their teeth, the wheel 68 having one less tooth than the wheel 69. The said wheel 68 is located within the cup 65 and fixed upon the adjacent end of a tubular shaft 70, which incloses the driving-shaft 64 and upon which the wheel 69 is loosely mounted. The projecting hub 71 of the gear-wheel 69 is provided with a ratchet-wheel 72, the teeth of which are engaged by a pawl 73, Fig. 2, extending upwardly and inwardly from a shaft 74, carrying a hand-wheel 75, by means of which the pawl is operated. The tubular shaft 70 has keyed to it about midway of its length a pinion 76, meshing into the main driving-wheel 77, mounted upon the shaft 16. When the power communicated to the gear-wheel 63, Fig. 4, and hence to the shaft 64, is "filtered," so to speak, through the "planet-motion" mechanism described, before it reaches the worm-pinion 76, meshing into the main driving worm-wheel 77, the machine will be driven very slowly, for the reason that one complete revolution of the shaft 64 and cup 65 will only rotate the tubular shaft 70 through a distance represented by one tooth of the gear-wheel 68. In this connection it may be explained that as the cup 65 revolves and carries the pinion 67 with it the same will gain what is represented by one tooth on the wheel 68 during each revolution of the cup, because the pinion 67 also meshes into the wheel 69, which contains one more tooth than the wheel 68. Therefore the pinion 67 operates upon the wheel 69 as a point of purchase to push the wheel 68 and turn the shaft 70, the wheel 69 being prevented from turning back by means of the pawl 73. It will thus be seen that for each complete revolution of the shaft 64 the tubular shaft 70 is moved only a fractional part of a revolution, when the movement of the shaft 64 is transmitted to the tubular shaft 70 through the "planet-motion" mechanism. In order to drive the main shaft 16 at its fast speed, I employ a coupling-disk 78, Fig. 4, which coacts with a sliding coupling-disk 79, feathered upon the tubular shaft 70, the parts 78 and 79 together constituting a clutch-head. The sliding coupling-disk 79 is embraced by the arms of a fork 80, the stem 81ª of which receives the arm 81 of a bell-crank lever hung upon a stud 82 and having its other arm, 83, furnished with a pin 84, which coacts with one or more clip-like cams 85, adjustably mounted upon the adjacent edge of the speed-wheel 36. These parts constitute automatic speed-changing mechanism and belong to the system connecting the driving-pulley with the main shaft. When the sliding coupling-disk 79 is moved into engagement with the fixed coupling-disk 78, the tubular shaft 70 will be coupled directly with the wheel 63 and be revolved at the speed thereof and transmit the same to the pinion 76, and therefore to the change-speed wheel 36, which will be rapidly rotated. It will be understood that inasmuch as the change-speed wheel 36 is rotated constantly the bell-crank lever will be operated automatically to couple the hollow shaft 70 with or uncouple it from the wheel 63, depending entirely upon the location of the cams 85 upon the speed-wheel 16. That will be determined by the character of the work to be done and is merely a question of timing the machine. The arm 83 of the bell-crank lever carries an antifriction-roller 86, coacting with the double-beveled head 87 of a plunger 88, the shank of which is encircled by a spring 89, exerting a constant effort to act through the said head 87 in holding the bell-crank lever 83 in either one or the other of its two positions. The parts just above described form a train or connection between the driving-pulley 28 and the main shaft 16. It will thus be seen that the "planet-motion" mechanism is automatically cut into and out of operation, so that the machine automatically shifts from its fast to its slow speed, and vice versa. The timing of the machine in this respect depends entirely, as stated, upon the location of the cams 85 upon the speed-wheel 36, and they will be set according to the character of the work to be done. When the machine is cutting, of course it must be run at its slow speed. When it is not cutting, it should be run at its high speed in order to effect an economy of time. The relation of the slow-speed running to the high-speed running in point of time will of course depend upon the character of the work being done, as in some cases the cutting will take more time than in others. Again, when the machine is running at its slow speed and cutting the speed must be varied according to the character of the cutting. Thus when the cutting is light the cutting-tools may be advanced to the work more rapidly than when the cutting is heavy. Then, again, the slow speed of the machine will be varied more or less according to the hardness or softness of the metal being cut. In order, therefore, to economize time in the slow running of the machine, I have provided the friction-disk speed-changing mechanism already described for modifying the slow speed of the machine according to the dictation of circumstances. There will naturally be less call to vary the speed of the machine when it is not doing any work and running at its fast rate; but by means of the friction-disk speed-changing mechanism its fast rate even may be made faster, if called for, to effect an economy of time. It will be understood, of course, that all these changes of speed from slow to fast, together with the modifications of the slow rate and, if desired, of the fast rate, are effected automatically by the devices described.

Figure 5:
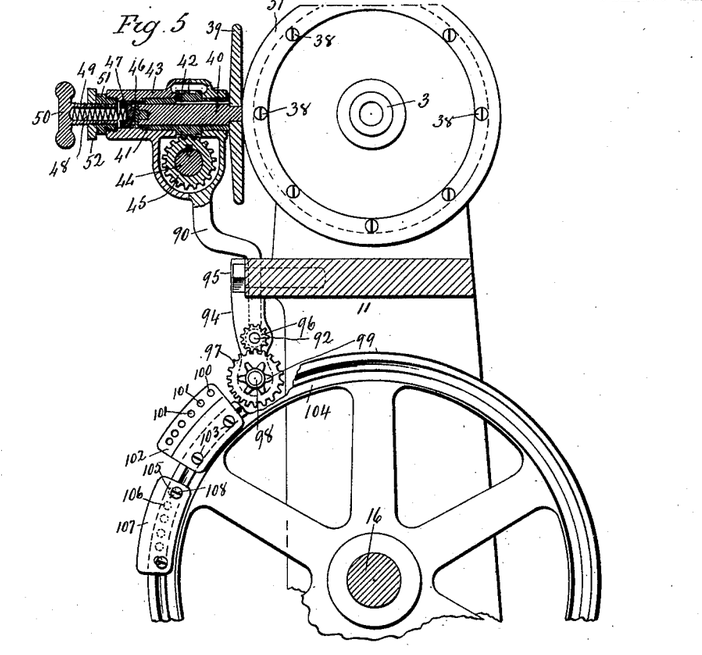
Fig. 5, a broken view of the machine in vertical section on the line *c d* of Fig. 1 looking from right to left.
Figures 6, 6A:
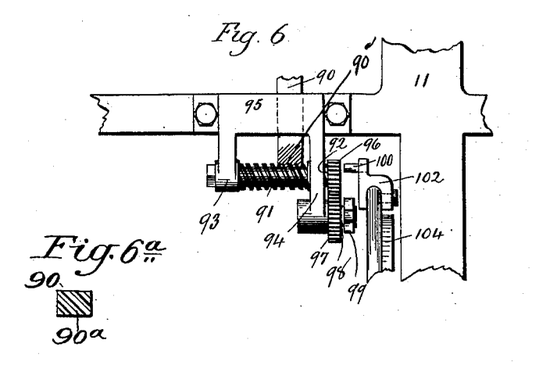
Fig. 6, a broken view in front elevation, showing the worm employed to shift the position of the friction-disk, together with the parts directly associated with the worm.

The speed at which the wheel 63 is driven depends upon the point on the friction-disk 39 engaged by the friction-ring 37. For the purpose of shifting this point the friction-disk 39 is moved at a right angle to the friction-ring 37 upon the shaft 44, before referred to. To this end the housing 43 aforesaid is furnished with a depending arm 90, Figs. 2 and 5, the lower end of which is formed with worm-teeth 90ª, intermeshing with the thread of a worm 91, secured to a shaft 92, journaled in the depending arms 93 and 94 of a bracket 95, secured to the frame 11 of the machine. The shaft 92 is provided at one end with a pinion 96, meshing into a pinion 97, mounted upon a stud 98, located in the arm 94 of the bracket 95. The stud 98 also carries a gear-wheel 99, made integral with or secured to the pinion 97. The said gear-wheel 99 is rotated in one direction by a pin 100, set, as desired, in one of a series of holes 101, formed in the edge of a plate 102, secured by screws 103 to the rim of a wheel 104, mounted on the main shaft 16, the pin in this instance engaging with the top side of the gear-wheel 99. The rotation of the star-wheel 99 in one direction by the pin 100 will operate through the pinions 97 and 96 to turn the worm 91, which will move the arm 90 of the housing 43, which will be correspondingly moved upon the shaft 44, whereby the center of the friction-disk 39 will be moved toward the friction-ring 37 and the speed of the disk 39 and main shaft 16 be diminished. The speed of the disk 39, and hence of the shaft 16, is increased by means of a pin 105, located in one of a series of holes 106, formed in a plate 107, attached by screws 108 to the rim of the wheel 104 in such position that the said pin will engage with the under side of the gear-wheel 99, whereby the same will be turned in the opposite direction and affect the opposite rotation of the pinions 97 and 96, and hence the opposite rotation of the worm 91, which will move the arm 90 and the housing 43 in the opposite direction and, as aforesaid, bring the center of the disk 39 toward the ring 37.

The parts just above described constitute what may be termed a "secondary connection" between the main shaft and the friction-disk.

Figure 7:
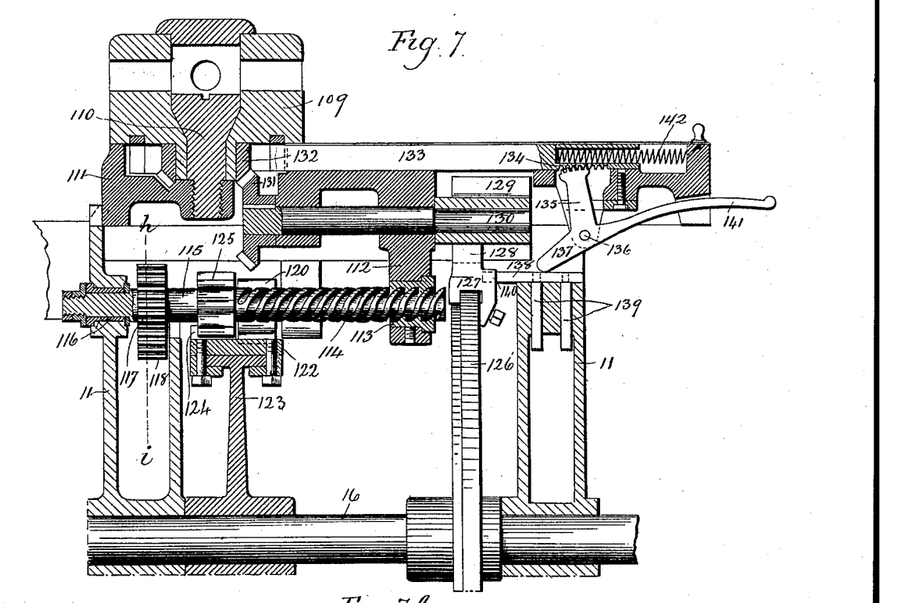
Fig. 7, a broken view in vertical section of the turret end of the machine, showing the turret-worm employed for locking, unlocking, and revolving the turret.

The next feature of my invention to be described is the means employed for reciprocating the turret 109, Fig. 7, back and forth away from and toward the work-holding chuck 4 for rotating the turret step by step and for locking it in each of its stepped positions. The turret carries the end cutting-tools and is of any approved construction. The said turret is mounted for rotation upon a heavy turret-stud 110, securing the turret to a heavy slide 111, which moves back and forth in ways in the machine-frame 11. This slide is formed with a depending arm 112, containing a bushing 113, receiving a double turret-worm 114, formed at one end of a turret-worm shaft 115, the outer end of which is encircled by a bushing 116, mounted in the frame of the machine.

The worm 114 above described is employed by me for moving the turret back and forth in place of the cam-wheels and cams heretofore employed. Inasmuch as the pitch of the threads of the worm cannot be changed, all variations in the speed of the backward-and-forward movement of the turret must be effected by varying the speed at which the worm is rotated. In other words, the worm must be differentially rotated as to speed to take the place of the irregular cams heretofore employed. This differential rotation of the screw is effected by means of the speed-changing devices already described—namely, the "planet-motion" mechanism, which rotates the worm slow at one time and fast at another, and the friction-disk speed-changing mechanism, which modifies the slow speed of the worm to a nicety as well as the fast speed of the worm, if that is necessary. This turret-worm, as will now be seen, when combined with the two kinds of speed-changing mechanisms answers for all kinds of work and does away with the expense and loss of time and labor heretofore involved in making and carefully adjusting irregular cams of various shapes as required for the production of different kinds of work. It also avoids the expense and loss of time and labor heretofore involved in drilling the old cam-wheels full of holes for the application of the various cams. Of course I could not employ the turret-worm except in conjunction with speed-changing devices adapted to be adjusted to a nicety, as mine are.

Figures 4, 9:
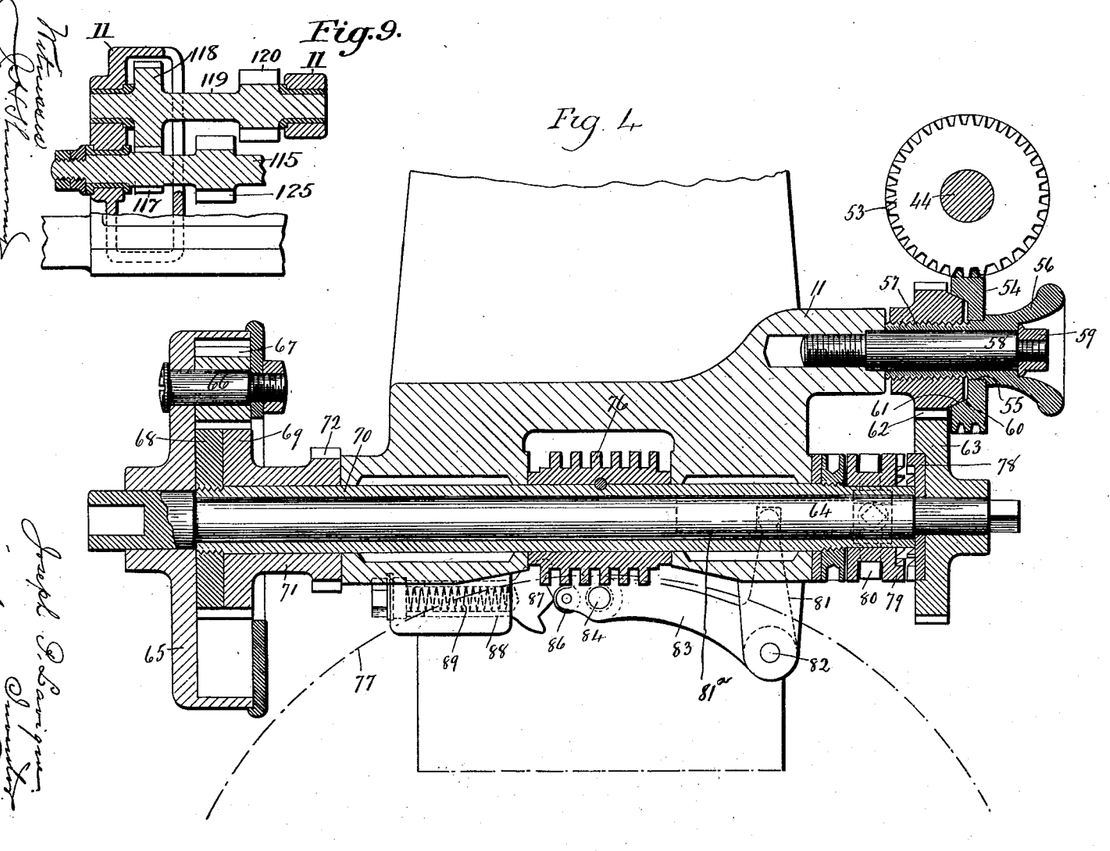
Fig. 4, a broken view of the machine in vertical section on the line *a b* of Fig. 1 and looking from left to right.
Fig. 9, a broken view in horizontal section of the gearing associated with the turret-worm.
Figures 7A, 8, 13:
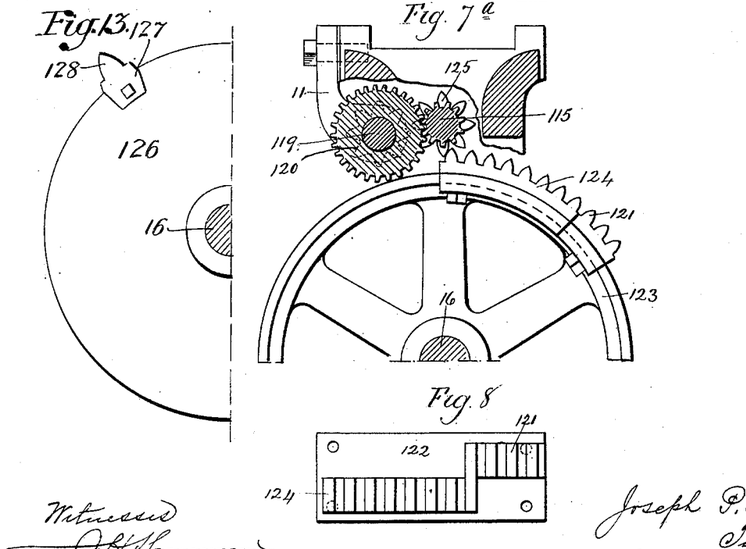
Fig. 8, a detached plan view of one of the interchangeable segmental racks used in conjunction with the turret-sliding wheel.
Fig. 13, a detached view in side elevation of the turret-revolving wheel.
Figures 10, 11, 12:
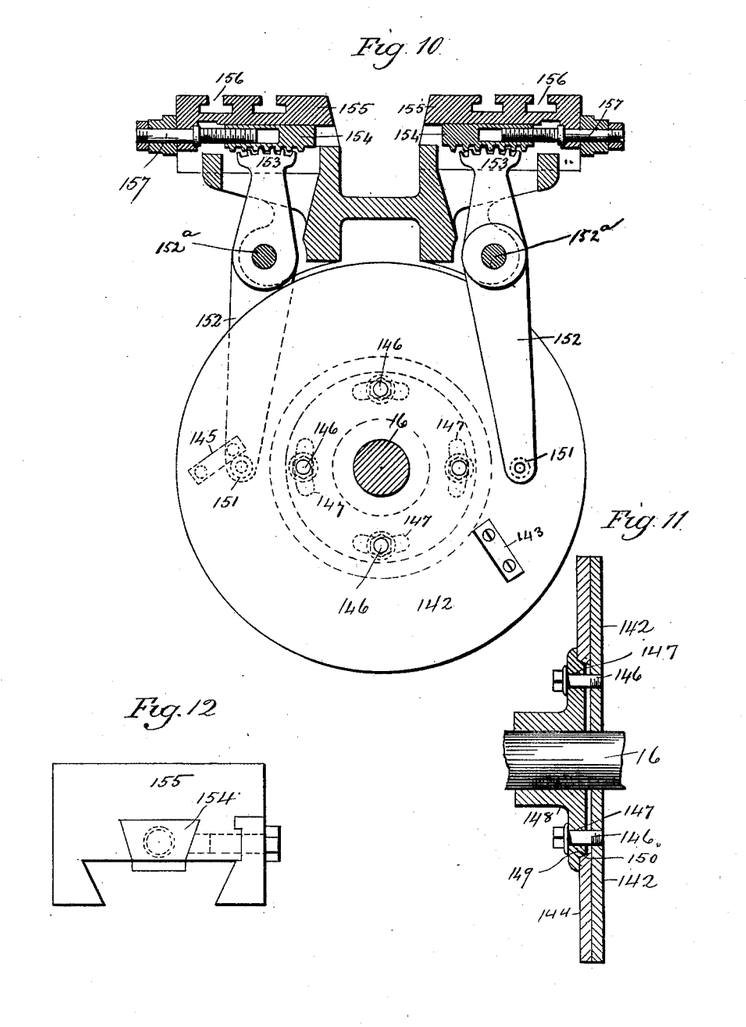
Fig. 10, a view in vertical transverse section on the line *e f* of Fig. 1 looking from right to left and showing the adjustable tool-operating mechanism.
Fig. 11, a broken sectional view of the adjustable tool cam-wheel.
Fig. 12, a detailed view showing one of the tool-slides in end elevation.

For advancing the turret the turret-worm shaft 115 is provided with a pinion 117, Fig. 9, meshing into a gear-wheel 118, located upon a short intermediate shaft 119, journaled in the frame 11 of the machine and driven by a star-wheel 120, operated by the short rack 121, Fig. 8, of a segment 122, mounted upon a wheel 123, secured to the main shaft 16 and to be designated hereinafter as the "turret-reciprocating" wheel for convenience of identification. The turret is retired or moved outward away from the chuck 4 by means of the long rack 124, forming a part of the same segment 122 and meshing into a gear-wheel 125, located directly upon the turret-worm shaft 115.

The turret is revolved step by step by means of a turret-revolving wheel 126, mounted on the main shaft 16 and provided with an adjustable toothed clip 127, the single tooth 128 of which engages with the teeth of a gear-wheel 129, secured to the outer end of a turret-driving shaft 130, the opposite inner end of which is provided with a bevel-gear 131, meshing into a corresponding bevel-gear 132, carried by the turret 109, which has step-by-step rotation imparted to it in this way, moving one step for every revolution of the wheel 126. As shown, the said wheel 126 is provided with one clip 127 only; but it will be understood that in practice it will be furnished with a number of clips depending upon the use of the machine.

For locking and unlocking the turret I employ a reciprocating locking-bar 133, the inner end of which enters locking-notches formed in the usual manner in the turret. Near its outer end the lower face of this slide is formed with rack-teeth 134, meshed into by corresponding teeth formed at the upper end of a rack-arm 135, hung upon a stud 136, and formed with an operating-arm 137, which engages with a vertically-movable plate or head 138, provided with two heavy guide-pins 139 139, free to move up and down in sockets formed in the frame 11 of the machine. The plate 138 is engaged at its inner end by a beveled cam-face 140 and formed upon the clip-like cam 127 and located so that in the operation of the machine it will lift the head 138 in time to unlock the turret before the rotation of the shaft 130 for rotating the turret through another step.

For the unlocking of the turret by hand I provide a hand-lever 141, formed integral with or attached to the arms 135 and 137, as shown in Fig. 7. By pressing this arm downward it is apparent that the bar 133 will be retracted and the turret unlocked. The said bar is provided in the usual manner with a spring 142 for moving it forward into its locked position.

For automatically moving the side cutting-tools toward and away from the work I employ a cam-wheel disk 142, carrying a cam 143, and a ring 144, carrying a cam 145, located on the opposite side of the cam-wheel from the cam 143. The disk 142 carries four small clamping-bolts 146, which pass through segmental slots 147, formed in a flanged hub 148, secured to the main shaft 16. The ring 144 has its inner edge formed with a bevel 149, resting upon a beveled shoulder 150, formed upon the hub 148, on which the ring is movable for concentric adjustment with respect to the disk 142, by means of which the ring is frictionally held in place on the shoulder 150 through the bolts 146. By loosening the said bolts 146 the disk 142 may be turned within the limits of the segmental slots 147. At the same time the ring 144 may be turned to any extent. The cams 143 and 145 coact with antifriction-rollers 151, journaled in the lower ends of operating-levers 152, hung on studs 152$^a$, formed at their upper ends with racks 153, meshing into sliding rack-bars 154, mounted in tool-carrying slides 155, formed with grooves 156 for the reception of the tool-carriers, (not shown,) in which the side cutting-tools are held. The bars 154 receive adjusting-screws 157, which provide for adjustment between the operating-levers 152 and the tool-carrying slides 155.

I now wish to call attention to the fact that the worms, of which several are employed in my improved machine in place of gear wheels or pinions, secure a smoothness, accuracy, and rapidity of operation which cannot be attained with gears or pinions. Obviously the worms operate with more accuracy than gears or pinions, and thus reduce the factor of backlash to the minimum. I also wish to call attention to the fact that by means of my improved adjustable clip-like cams applied to the edges of the cam wheels or disks and employed in place of the block-cams heretofore generally used and applied to the faces or sides of the cam-wheels I am enabled to adjust the machine rapidly, conveniently, and very closely by simply sliding the clip-like cams or pin-carriers over the edges of the wheels or disks which they straddle and clamp them thereupon in any position of adjustment, whereas cams of the ordinary type have to be screwed or bolted in place and are limited in their range of adjustment by the screw-holes in the cam-wheels. These two features of improvement alone make my machine superior in smoothness and accuracy of operation and range of fine adjustment to the machines heretofore used.

It is apparent that in carrying out my invention some changes from the construction herein shown and described may be made. I would therefore have it understood that I do not limit myself to the exact construction herein shown and described, but hold myself at liberty to make such changes therefrom and alterations therein as fairly fall within the spirit and scope of my invention.

Having fully described my invention, what I claim as new, and desire to secure by Letters Patent, is—

1. In a lathe, the combination with the work-spindle thereof, of a driving-pulley therefor, a friction-disk located at a right angle to the said pulley and frictionally driven thereby, a main shaft carrying the means for driving and controlling the several instrumentalities of the lathe, connections between the said disk and shaft for driving the latter, and means controlled by the shaft for moving the said disk transversely with respect to the pulley for changing the speed of the shaft.

2. In a lathe, the combination with the work-spindle thereof, of a driving-pulley therefor, a friction-disk frictionally driven by the said pulley, a shaft carrying the means for driving and controlling the several instrumentalities of the lathe, connections between the said disk and shaft whereby the shaft is driven by the disk, and other connections between the shaft and disk whereby the disk is shifted for varying the speed of the shaft.

3. In a lathe, the combination with the work-spindle thereof, of a driving-pulley therefor, a friction-disk frictionally driven by the said pulley, a main shaft carrying the means for driving and controlling the several instrumentalities of the lathe, connections between the disk and shaft, whereby the shaft is driven by the disk, and connections between the shaft and disk, whereby the disk is shifted for varying the speed of the shaft, the said connections last mentioned including an arbor for the disk, a movable housing for the said arbor, a shaft carrying the said housing, a worm-pinion mounted on the said arbor, a worm-gear mounted on the shaft supporting the said housing, and means driven from the said main shaft for moving the housing on its supporting-shaft.

4. In a lathe, the combination with the work-spindle thereof, of a driving-pulley therefor, a friction-disk frictionally driven by the said pulley, a main shaft carrying the means for driving and controlling the several instrumentalities of the lathe, connections between the disk and shaft which is driven by the disk, the said connections including automatic speed-changing mechanism for driving the shaft fast and slow, and speed-changing connections between the shaft and disk for shifting the disk with respect to the pulley, whereby the speed at which the main shaft is driven is further modified by its own action.

5. In a lathe, the combination with the work-spindle thereof, of a driving-pulley therefor, a friction-disk frictionally driven by the main driving-pulley, a main shaft carrying the means for driving and controlling the several instrumentalities of the lathe, connections between the disk and shaft for driving the shaft, the said connections including speed-changing mechanism for driving the shaft fast and slow, and means for automatically cutting the said speed-changing mechanism into and out of operation including a clutch, a wheel mounted on the main shaft, and adjustable connection between the wheel and clutch for timing the operation thereof.

6. In a turret-lathe, the combination with a turret and a turret-slide, of a turret-worm connected with the slide, a main shaft carrying the means for driving and controlling the several instrumentalities of the lathe, and connections between the shaft and turret, including a turret-worm, a turret-worm shaft, gear-wheels, a rack-wheel on the main shaft, and racks carried by the said rack-wheel and coacting with the said gear-wheels for rotating the same in opposite directions for reversing the movement of the turret-worm shaft.

7. In a lathe, the combination with a turret, of a main shaft carrying the means for driving and controlling the several instrumentalities of the lathe, and connections between the shaft and turret, including a turret-worm, a turret-worm shaft, a pinion located on the said shaft, a gear-wheel meshed into by the said pinion, a gear-wheel rotating with the said gear-wheel, a gear-wheel located on the turret-worm shaft, a rack-wheel mounted on the main shaft, and adjustable segmental racks carried by the rack-wheel and coacting with the gear-wheel rotating with the gear-wheel, and the gear-wheel located on the turret-worm shaft, whereby, although the rack-wheel constantly revolves in one direction, the turret-worm is reversed.

In testimony whereof I have signed this specification in the presence of two subscribing witnesses.

JOSEPH P. LAVIGNE.

Witnesses:
HAROLD A. FISHER,
A. G. MCINTYRE.